H. B. COATS.
VEHICLE WHEEL.
APPLICATION FILED OCT. 10, 1914.

1,216,076.

Patented Feb. 13, 1917.
2 SHEETS—SHEET 1.

WITNESSES:

INVENTOR
Henry B. Coats.

BY
ATTORNEY

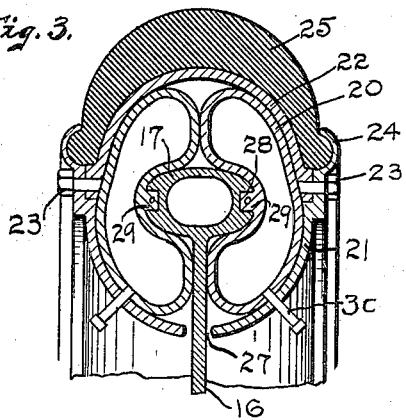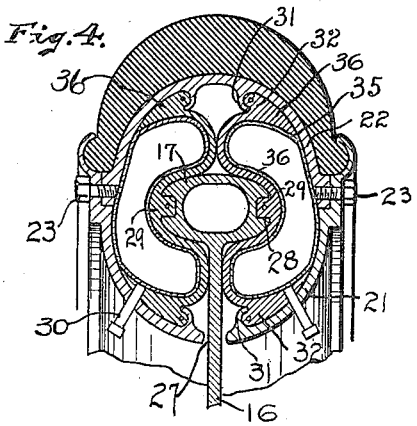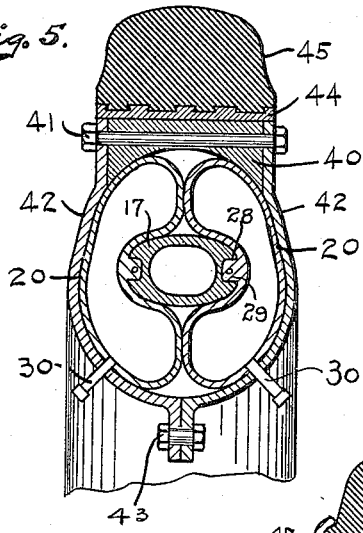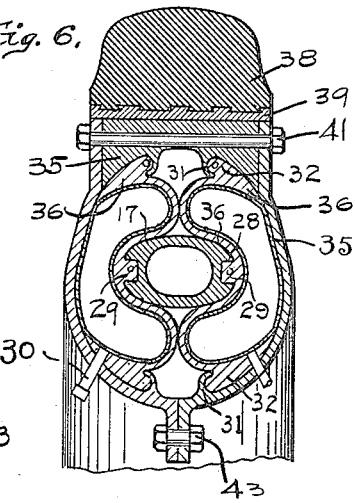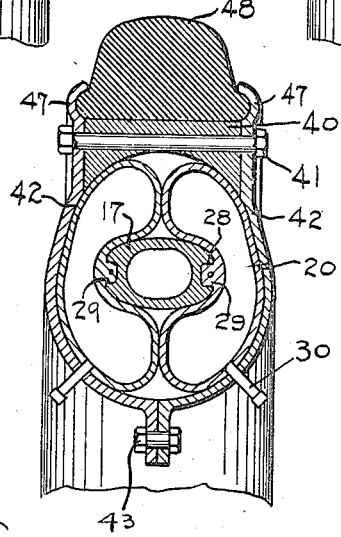

UNITED STATES PATENT OFFICE.

HENRY B. COATS, OF VEEDERSBURG, INDIANA.

VEHICLE-WHEEL.

1,216,076.  Specification of Letters Patent.  Patented Feb. 13, 1917.

Application filed October 10, 1914. Serial No. 866,104.

*To all whom it may concern:*

Be it known that I, HENRY B. COATS, a citizen of the United States, and a resident of Veedersburg, county of Fountain, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is a non-puncturable vehicle wheel having a better construction and operation of a type which have air cushions intermediate the hub and rim or tread thereof, wherein the hub floats in the wheel being yieldingly supported therein by the air cushions. Since the pneumatic cushion is inclosed within said tire, it is non-puncturable.

The chief feature of the invention consists in providing a tubular rim containing an air cushion or cushions within it, said air cushion or cushions supporting an annular member located in said tubular rim and connected rigidly with the hub so that said annular member will be yieldingly supported by said air cushion or cushions and thus yieldingly support the hub in the rim of the wheel.

Another feature of the invention consists in providing in said tubular rim a pair of oppositely located annular air cushions, each substantially semi-circular in cross section, which coöperate to envelop and support the annular member which carries the hub.

Another feature of the invention consists in the broad idea of supporting the hub of the wheel by means located in the midst or central portion of the air cushion structure so that there will be ready distribution of the air. Heretofore the load has been applied to air cushions at their peripheries, whereas here the hub supporting member is located annularly between and in the middle of the air cushions.

Figure 1:
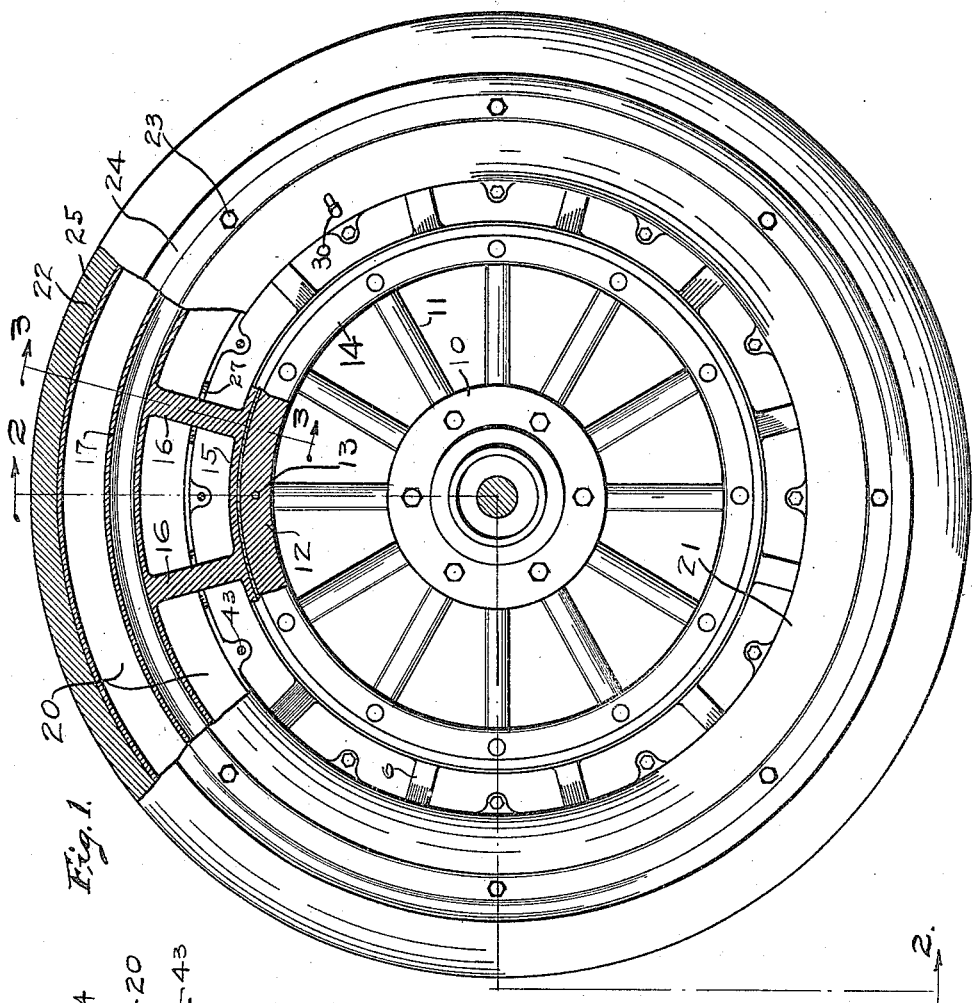
Figure 2:
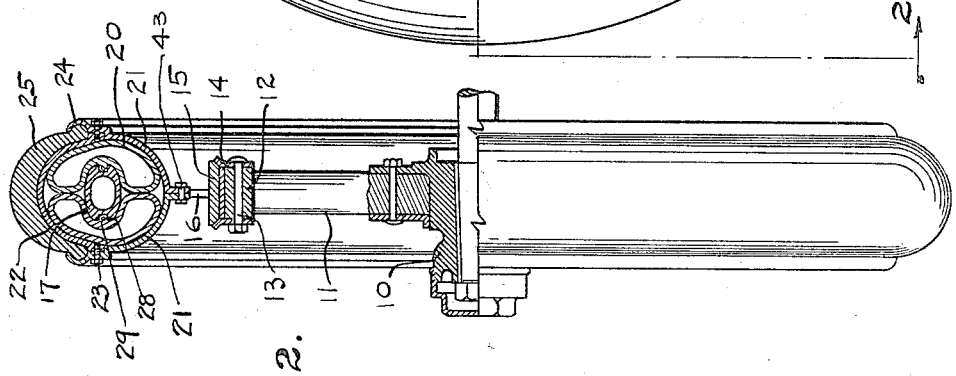

The full nature of the invention will be understood from the accompanying drawings and the following description and claims:

In the drawings, Figure 1 is a side elevation of said vehicle wheel with a portion thereof in circumferential radial section. Fig. 2 is an elevation of the lower half of said wheel and a central vertical section of the upper half thereof as indicated by line 2—2 of Fig. 1. Fig. 3 is a section on the line 3—3 of Fig. 1. Fig. 4 is a similar section of a modified form. Figs. 5, 6 and 7 are sections of modified forms on a portion of the line 3—3.

This wheel consists of three portions: a central or main wheel portion, a tire portion, and a detachable rim portion which is mounted in connection with the tire so as to float therein. The central or main rim portion includes a hub 10, spokes 11, and rim 12 of practically ordinary type, excepting that the rim 12 has transverse holes through it for bolts 13 which clamp plates 14 to the opposite sides of the rim for securing the demountable tire member. To that end, the outer ends of the plates 14 are beveled or opened away from each other so as to overlap and engage the demountable rim 15, and as the bolts 13 are tightened said plates 14 impress the rim 15 and wedge it outward until it is rigidly mounted on the central member of the wheel.

Members 16 extend from the demountable rim radially outward and carry the annular member 17, which is preferably tubular. The member 17 is carried by and mounted in and between the pair of oppositely located annular air cushions 20, which are inclosed in an annular metal rim formed of the inner half or portions 21 and the outer rim portion 22 secured together by bolts 23 into one annular tubular member, and having on opposite sides flanges 24 for holding the beads of the solid rubber tire 25.

Therefore parts 15, 16 and 17 constitute a solid frame demountable from the inner or main part of the wheel and floating in the hollow tire rim, so that the vibration of the parts in relation to each other is located entirely within the hollow tire rim. This is accomplished by the arms 16 extending loosely through slots 27 in the members 21 of the hollow tire rim, so that the tubular member 17 and tire rim are radially movable in relation to each other. The tubular member 17 has on each side flanges 28 for securing and holding extensions 29 from the air cushions 20. The object is to secure the opposite sides of the member 17 to one side of each air cushion, about midway between the inner and outer peripheries of such cushion, so that the secured parts of the tubular member 17 and cushions will move or vibrate together. The cushions are filled with compressed air through the stems 30 which project through the members 21 of the tire rim.

In the modified form shown in Fig. 4, the air cushions are made in combined form, there being an inner casing 35 surrounded partly by the tire rim members 21 and 22 and partly by a casing 36, which is secured to the tubular member 17 at an intermediate point; and the peripheries of said casing 36 are provided with beads 32 fitting in flanges 31 extending inward from the tire members.

The form shown in Fig. 5 shows the construction of the tire rim, which is composed of an outer annular part 40 with a cylindrical external surface and secured by bolts 41 to a pair of members 42 which make up the remainder of the tire rim, the inner portion of said tire rim members being secured together by bolts 43. A band 44 is mounted on the tire rim, and to said band the rubber tire 45 is secured.

Fig. 6 is substantially the same as Fig. 5 excepting as to the manner of arrangement of the air cushions, which are similar to Fig. 4. Fig. 7 is the same excepting that the bolt 41 extends entirely through the part 40 and the parts 42 of the tire rim have flanges 47 which engage the beads of the solid rubber tire 48. These Figs. 4 to 7 indicate possible altered construction of that shown in the first three figures.

It is noted that in all of these forms the hub supporting member 17 is carried between the two air cushions or, in other words, in the air cushion structure, so that the strain of the load on the air cushions may be transmitted in any direction through the air because the air cushions envelop the hub supporting structure.

The invention claimed is:

1. A vehicle wheel having a hollow annular rim, a hub, an annular member connected with the hub portion and extending within said rim, and pneumatic means for mounting said hub supporting member in said rim, said pneumatic means consisting of a pair of annular air cushions substantially semi-circular in cross section and located in said rim on opposite sides of said hub supporting member so as to envelop the same.

2. A vehicle wheel having a tubular rim with a series of slots in the inner periphery thereof, a hub-supporting annular rim-like member within said rim substantially elliptical in cross section, a hub, bars extending therefrom through said slots to said hub-supporting member, and a pair of annular pneumatic cushions in said rim portion, one on each lateral side of said hub-supporting member and the inner and outer portions of said cushions meeting and engaging each other near the inner and outer peripheries of said hub-supporting member so as to envelop the same, substantially as set forth.

3. A vehicle wheel having a tubular rim with a series of slots in the inner periphery thereof, a hub-supporting annular rim-like member located within said rim substantially elliptical in cross section, a hub with spokes extending therefrom through said slots to said hub-supporting member, and a pair of annular pneumatic cushions in said rim portion, one on each lateral side of said hub-supporting member and secured to the side of said member at intervals and so arranged, as to envelop the outer and inner peripheries of said hub supporting member.

4. A vehicle wheel having a hollow tubular rim formed of a plurality of separable annular sections having inwardly extending annular flanges, a hub, an annular member connected with the hub portion and extending within said rim, pneumatic means for mounting said hub supporting member in said rim, said pneumatic means consisting of a pair of annular air cushions substantially semi-circular in cross section and located in said rim so as to engage each other and coöperate substantially to envelop said hub supporting member, and a protecting member between each air cushion and said hub supporting member and having beads along the external and internal peripheries thereof fitting in said flanges in the rim.

In witness whereof, I have hereunto affixed my signature in the presence of the witnesses herein named.

HENRY B. COATS.

Witnesses:
J. H. WELLS,
R. G. LOCKWOOD.